United States Patent [19] [11] 4,074,356

Schiller et al. [45] Feb. 14, 1978

[54] FLUID DELIVERY CONTROL AND REGISTRATION SYSTEM

[75] Inventors: Robert J. Schiller, Simsbury; Theodore Charles Perrill, Vernon, both of Conn.

[73] Assignee: Veeder Industries, Inc., Hartford, Conn.

[21] Appl. No.: 720,789

[22] Filed: Sept. 7, 1976

[51] Int. Cl.[2] .......................... B67D 5/16; G06F 15/56

[52] U.S. Cl. .............................. 364/465; 235/92 FL; 222/23

[58] Field of Search ...................... 235/151.34, 92 FL; 222/28, 30, 33, 23, 29, 25–27; 328/65; 307/88 MP

[56] References Cited

U.S. PATENT DOCUMENTS

| | | | |
|---|---|---|---|
| 3,580,421 | 5/1971 | Bickford | 222/27 |
| 3,666,928 | 5/1972 | Burke et al. | 235/151.34 X |
| 3,749,283 | 7/1973 | Nelson | 222/27 |
| 3,756,630 | 9/1973 | Bickford | 235/151.34 |
| 3,765,567 | 10/1973 | Maiocco et al. | 222/30 |
| 3,821,537 | 6/1974 | O'Keefe | 235/151.34 X |
| 3,878,377 | 4/1975 | Brunone | 222/26 X |
| 3,895,738 | 7/1975 | Buchanan et al. | 222/26 |
| 3,949,207 | 4/1976 | Savary et al. | 222/26 X |
| 3,984,661 | 10/1976 | Mayer et al. | 235/151.34 X |

*Primary Examiner*—Edward J. Wise

*Attorney, Agent, or Firm*—Prutzman, Hayes, Kalb & Chilton

[57] ABSTRACT

A fuel delivery control and registration system having a bank of four BCD price switches for establishing a unit volume price within a four place price range; a BCD memory for accumulating BCD cost and volume amounts of the fluid dispensed; a binary adder summation circuit operated by a decimal volume pulse provided for each one-hundredth increment or one-thousandth increment of a unit volume, depending on the established unit volume price, for indexing the BCD volume amount stored in the memory one count and for indexing the BCD cost amount stored in the memory by the decimal price of the decimal volume pulse increment; and cost and volume indicators with incandescent 7-segment numeral displays for registering the cost and volume amounts stored in the BCD memory. An operator's control circuit provides for remotely manually authorizing a fluid delivery, for remotely temporarily discontinuing a delivery and recontinuing the delivery from the existing accumulated volume and cost amounts stored in the memory, and for remotely presetting a whole number volume or cost amount of fuel to be delivered and timely operating a two-stage fuel shut-off valve by means of serial comparison of each BCD amount of a preset multiple place BCD cost or volume amount and a corresponding multiple place BCD cost or volume amount stored in the BCD memory.

28 Claims, 4 Drawing Figures

FLUID DELIVERY CONTROL AND REGISTRATION SYSTEM

BRIEF SUMMARY OF THE INVENTION

The present invention relates to a new and improved fluid delivery control and registration system having notable utility in controlling and registering the cost and volume amounts of each fuel delivery of a fuel pump.

It is a primary aim of the present invention to provide a new and improved electronic fuel delivery control and registration system useful in providing for remote control of customer self-service delivery of fuel and in displaying the cost and/or volume amounts of the fuel delivered at the delivery station for customer use and at a remote controller's station for the controller's use in charging for the self-service delivery.

It is another aim of the present invention to provide a new and improved electronic fuel delivery registration system for electronically accumulating and registering the volume amount of fuel delivered and the cost amount of the fuel delivered in accordance with the volume amount delivered and a pre-established unit volume price.

It is a further aim of the present invention to provide a new and improved cost computation and registration system for accurately computing and accumulating the cost of the fuel delivered in accordance with the volume amount delivered and a unit volume price established within an available unit volume price range extending to one dollar or more and in which the cost is computed and accumulated with the requisite degree of accuracy throughout the available unit volume price range.

It is a further aim of the present invention to provide a new and improved fluid delivery registration system for accurately computing and accumulating the cost of fuel dispensed in accordance with an established unit volume price within a four place price range.

It is another aim of the present invention to provide a new and improved cost and volume registration system employing FIG. 8 type incandescent indicators and having a new and improved indicator operating system for increasing their useful operating life.

It is another aim of the present invention to provide a new and improved cost and/or volume preset system for presetting the cost and/or volume of fuel to be delivered and for automatically accurately terminating the delivery when the preset amount is delivered.

It is a further aim of the present invention to provide a new and improved fuel delivery preset system of the type providing a two-stage shut-off of the fuel delivery.

It is another aim of the present invention to provide a new and improved electronic computing and accumulating system, operable by a train of input volume pulses having a volume pulse for each predetermined volume increment of fuel delivered, for accumulating the volume amount of fuel delivered and for computing and accumulating the cost amount of fuel delivered in accordance with a pre-established unit volume price. In accordance with a feature of the present invention, the computing and accumulating system provides for sensing the presence of extraneous input pulses and the loss of valid input pulses and for signalling the presence of such pulse errors and preventing any resulting erroneous accumulation of the cost and volume amounts of fuel delivered.

It is another aim of the present invention to provide a new and improved remote control system for controlling the operation of a fuel pump by a self-service customer which permits remote activation of the fuel pump for delivering fuel and subsequent temporary de-energization of the fuel pump and discontinuance of the fuel delivery, as for example when some hazard may be present, and then re-energization of the fuel pump and continuance of the fuel delivery by the customer from the existing accumulated amount when the delivery was temporarily halted.

It is a further aim of the present invention to provide a new and improved electronic fuel delivery cost computation and accumulation system for computing and accumulating the cost amount of fuel delivered in accordance with the number of incremental volume pulses generated and an established unit volume price.

It is another aim of the present invention to provide in an electronic accumulation and registration system operable for accumulating the cost and/or volume amounts of fuel delivered and registering the cost and/or volume amounts so accumulated with incandescent numeral indicators, a new and improved signalling system for signalling certain operational failures in the system.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1A:
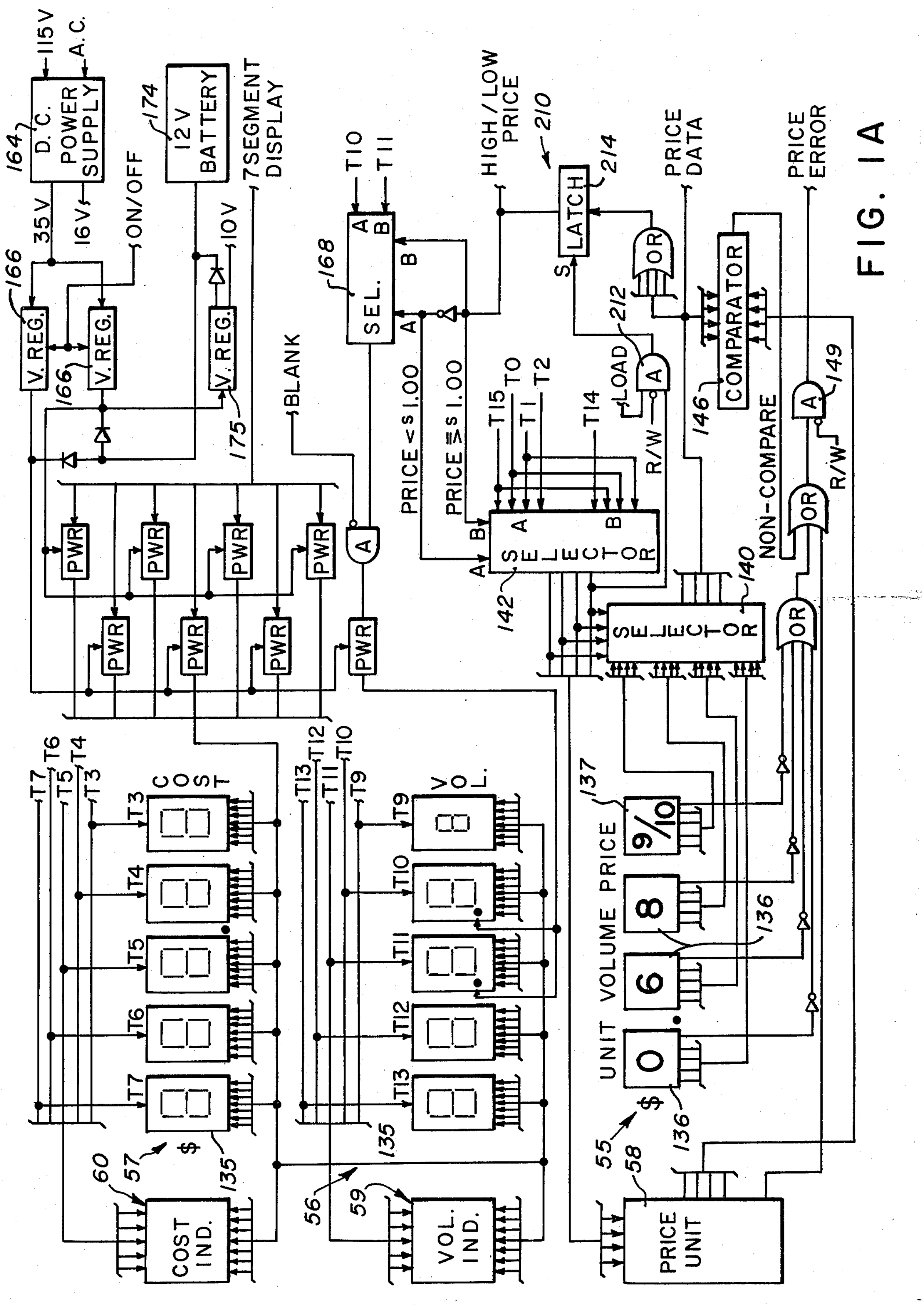
FIGS. 1A through 1D are collectively a combined diagrammatic representation and functional logic schematic, partly broken away, of a fluid delivery control and registration system incorporating an embodiment of the present invention.
Figure 1B:
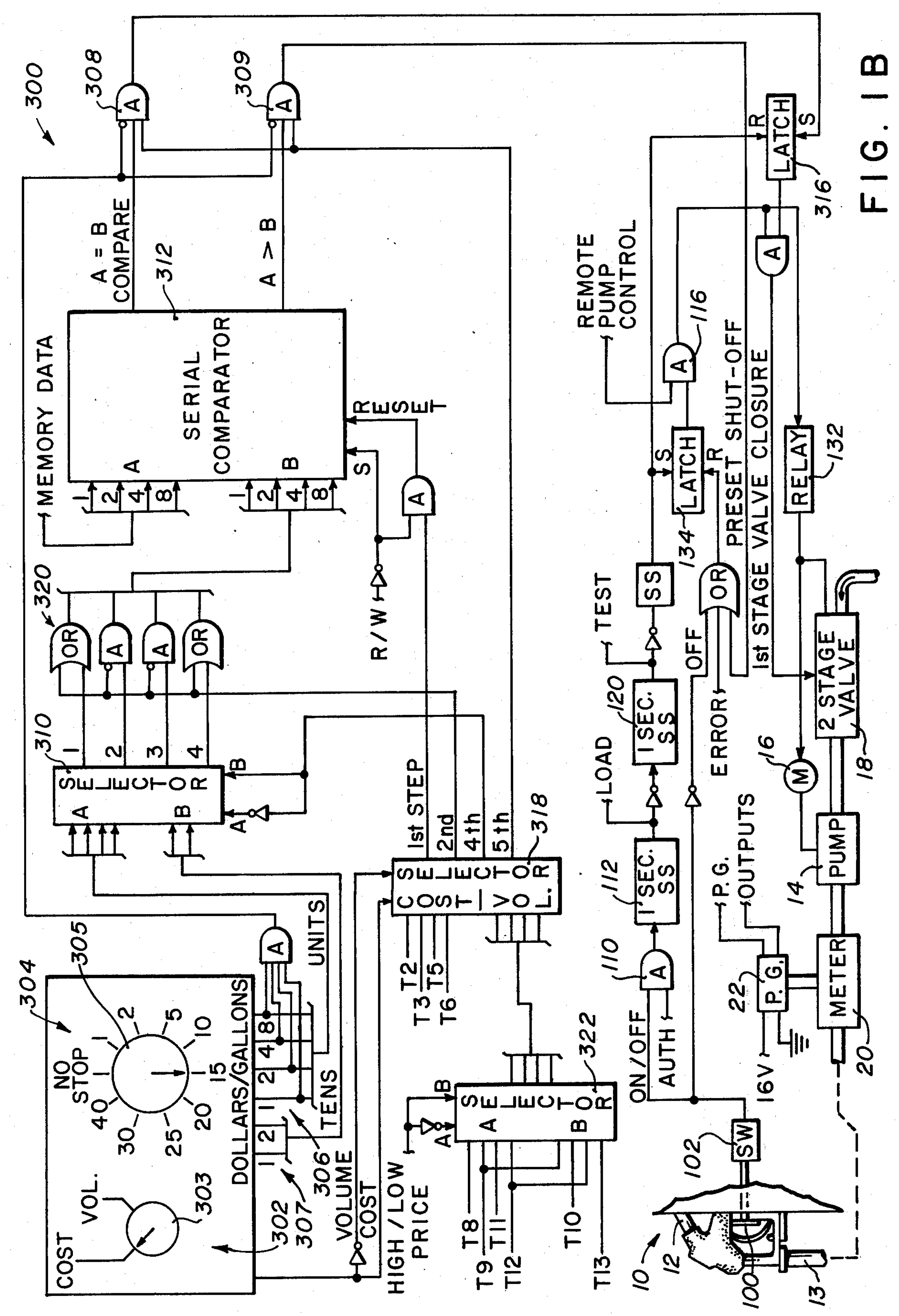
Figure 1C:
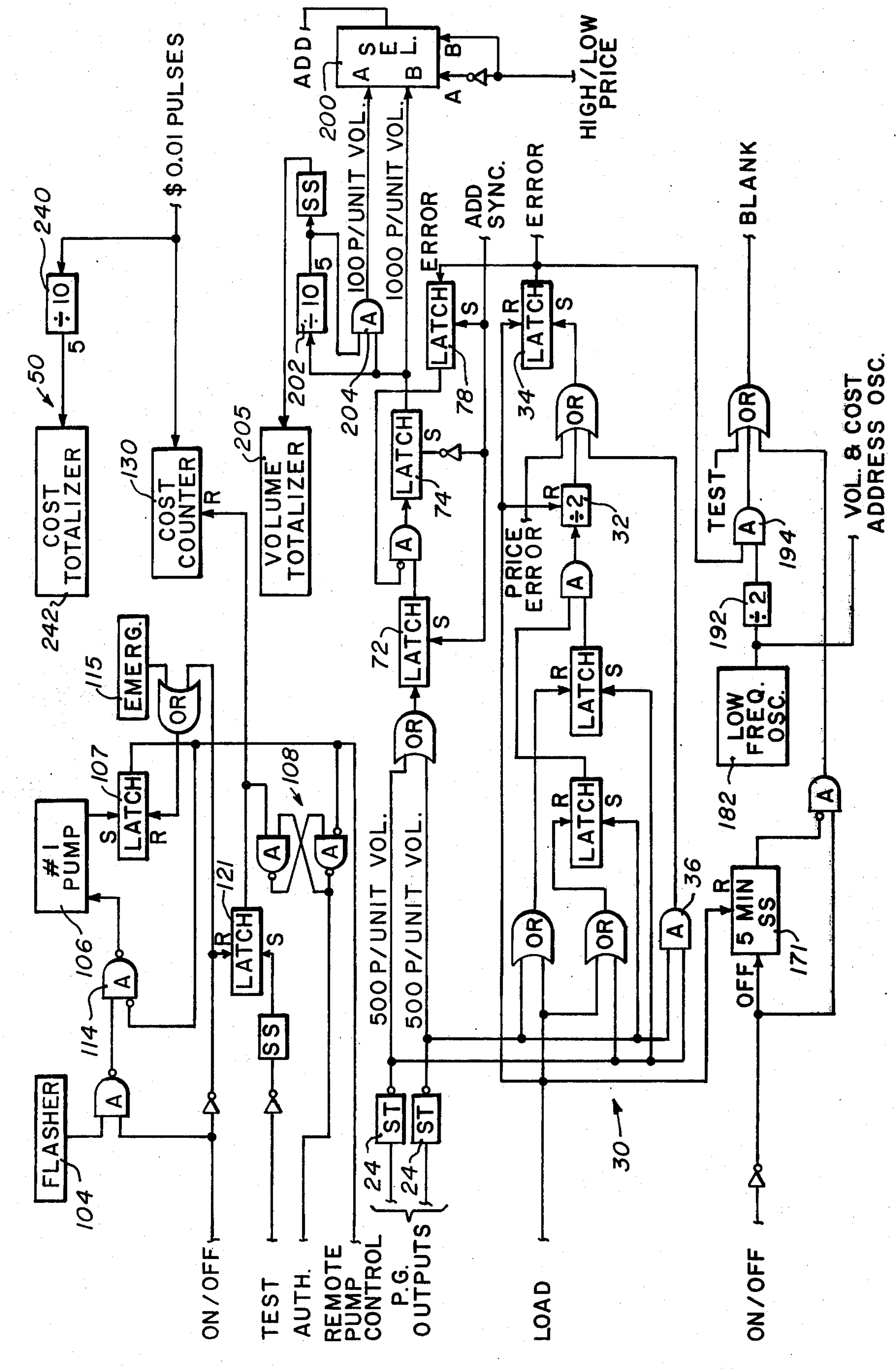

Referring now to the drawings in detail, an embodiment of a fluid delivery control and registration system incorporating the present invention is shown provided for controlling and registering the delivery of fuel from a fuel delivery system or pump 10 (FIG. 1B). In a conventional manner, a dispensing nozzle 12 of the delivery pump 10 is connected via a hose 13 in series with a two-stage shut-off valve 18, a pump 14 driven by a motor 16 and a meter 20 for being selectively supplied fuel under pressure. A suitable pulse generator 22 (for example as shown and described in U.S. Pat. No. 3,786,272 of John G. Gamble et al., dated Jan. 15, 1974 and entitlted "Hall Effect Rotary Pulse Generator") driven by the meter 20 is operable for generating two separate non-overlapping volume pulse trains in its two output leads. Each separate volume pulse train has 500 generally evenly spaced pulses (electronically provided by detecting the pulse edges of 250 generated pulses) for each unit volume of gasoline on which the gasoline unit volume price is based (e.g., a pulse for each 1/500th increment of a gallon dispensed). In the shown embodiment, for the purpose of sensing a pulse generator power failure as hereinafter described, the pulse generator output leads normally have a 16V applied voltage and each volume pulse is a ground potential pulse. However, the pulse generator output leads are connected to suitable Schmidt trigger inverters 24 (FIG. 1C) for generating inverted volume pulses for operating the receiver logic circuitry.

A pulse error detection circuit 30 is provided for sensing if pulses are correctly alternately received from the two pulse generator outputs. A divide-by-two circuit 32 of the error detection circuit 30 stores any first pulse error received (e.g., occurring when successive pulses are received from the same lead due to slight oscillation of the meter 20 and pulse generator 22 when fuel is supplied under pressure to the hose 13 at the beginning of a fuel delivery) and any second pulse error is then operative via the divide-by-two circuit 32 to set an error latch 34 for generating an "error" signal.

The error detection circuit also employs an AND gate 36 for setting the error latch 34 when the voltage in both pulse generator output leads to the Schmidt trigger inverters 24 is low (ground) for example, when there is a break in the power line to the pulse generator 22 or when a main DC power supply 64 of the system fails. Also, a "price error" signal (FIG. 1A), generated as hereinafter described, is operative to set the error latch 34 when an error is detected in the unit volume price units of the system used in computing the cost of fuel delivered.

The subject control and registration system is designed to be compatible with the remote control and registration system disclosed in related U.S. Pat. No. 3,878,377 of Peter P. Brunone dated Apr. 15, 1975 and entitled "Fluid Delivery Control And Registration System" and to be connected to that system, for example for remotely controlled customer self-service operation. Alternatively, the subject control and registration system may employ a remote control circuit 50 (FIG. 1C) and a remote preset circuit 300 (FIG. 1B) for use by a remote state operator in connection with customer self-service operation of the fuel pump 10. In either type of installation, the subject control and registration system has primary utility as an integrated system for accumulating and registering the cost and volume amounts of a customer self-service fuel delivery and with each customer handling his own fuel delivery after receiving authorization from a remote operator and paying the remote operator for the fuel either before or after the delivery as required.

The subject control and registration system comprises, at the delivery station, a four digit unit volume price indicator 55 for establishing and displaying the unit volume price of fuel (from $0.000 to $9.999 per gallon in the shown embodiment); a five digit volume indicator 56 for displaying the accumulated volume amount of fuel delivered (up to 999.99 gallons where the established unit volume price is less than one dollar and up to 99.999 gallons where the established unit volume price is one dollar or more); and a five digit cost indicator 57 for displaying the accumulated cost amount of fuel delivered (up to $999.99) in accordance with the accumulated volume amount of fuel delivered and the established unit volume price. Preferably, as shown in FIG. 1A, the lowest order volume indicator digit has a numeral display somewhat smaller than the remaining numeral displays of the volume and cost indicators to help distinguish the volume and cost indicator readouts.

A duplicate price unit 58 (incorporating a duplicate price indicator 55, a price digit output selector 140 and an OR gate price setting error detection circuit) and duplicate volume and cost indicators 59, 60 are provided for displaying the unit volume price, volume and cost on the opposite side of the fuel pump from the indicators 55–57 in a generally conventional manner.

Each cost indicator or register 57, 60 comprises five individual 0–9 digit displays or indicators 135 connected for displaying the cost of fuel dispensed to two decimal places. Also, each volume indicator 56 comprises five individual 0–9 digit displays or indicators 135 connected for displaying the volume of fuel dispensed to two decimal places when the unit volume price is less than one dollar and to three decimal places when the unit volume price is one dollar or more. The 0–9 digit displays 135 which are shown are 7-segment FIG. 8 type incandescent display tubes (e.g., Numitron incandescent display tubes sold by Radio Corporation of America), and, as hereinafter more fully described, all of the digit displays 135 are connected to be operated by a seven lead output of a display decode latch 86 and to be timely strobed for displaying the cost and volume data stored in a 6word, read/write random access memory or RAM 69.

Each four digit price indicator or register 55 comprises three higher order 0–9 BCD decades 136 bearing a sequence of 0–9 indicia and a lowest order 0–9 BCD decade 137 bearing a sequence of 1/10–9/10 indicia, which collectively display the established unit volume price of fuel within a four place price range and to three decimal places. The BCD price decades 136, 137 may for example be suitable photoelectric switches having a number wheel providing a numeral readout of the binary switch position and suitable means for selectively setting the switch and number wheel. Also, each BCD price decade 136, 137 has a photoelectric position sensing means for sensing that the decade is in a whole number position and its BCD output therefore accurately corresponds to its position. Alternatively, the BCD output signal for the "0" position of each price decade 136, 137 may be encoded initially as a straight binary 10 signal (and then suitably recoded as a straight binary 0 signal) and the BCD outputs of the price decades 136, 137 be sensed to ensure there is a valid BCD output signal (i.e., not a straight binary 0 signal) from each price decade 136, 137. With either sensing circuit, if any of the decades 136, 137 of the indicator 55 or price unit 58 are not accurately set at a whole number position or are reset during the delivery of fuel, a "price error" signal will be transmitted from a timing gate 149 to set the error latch 34.

Figure 1D:
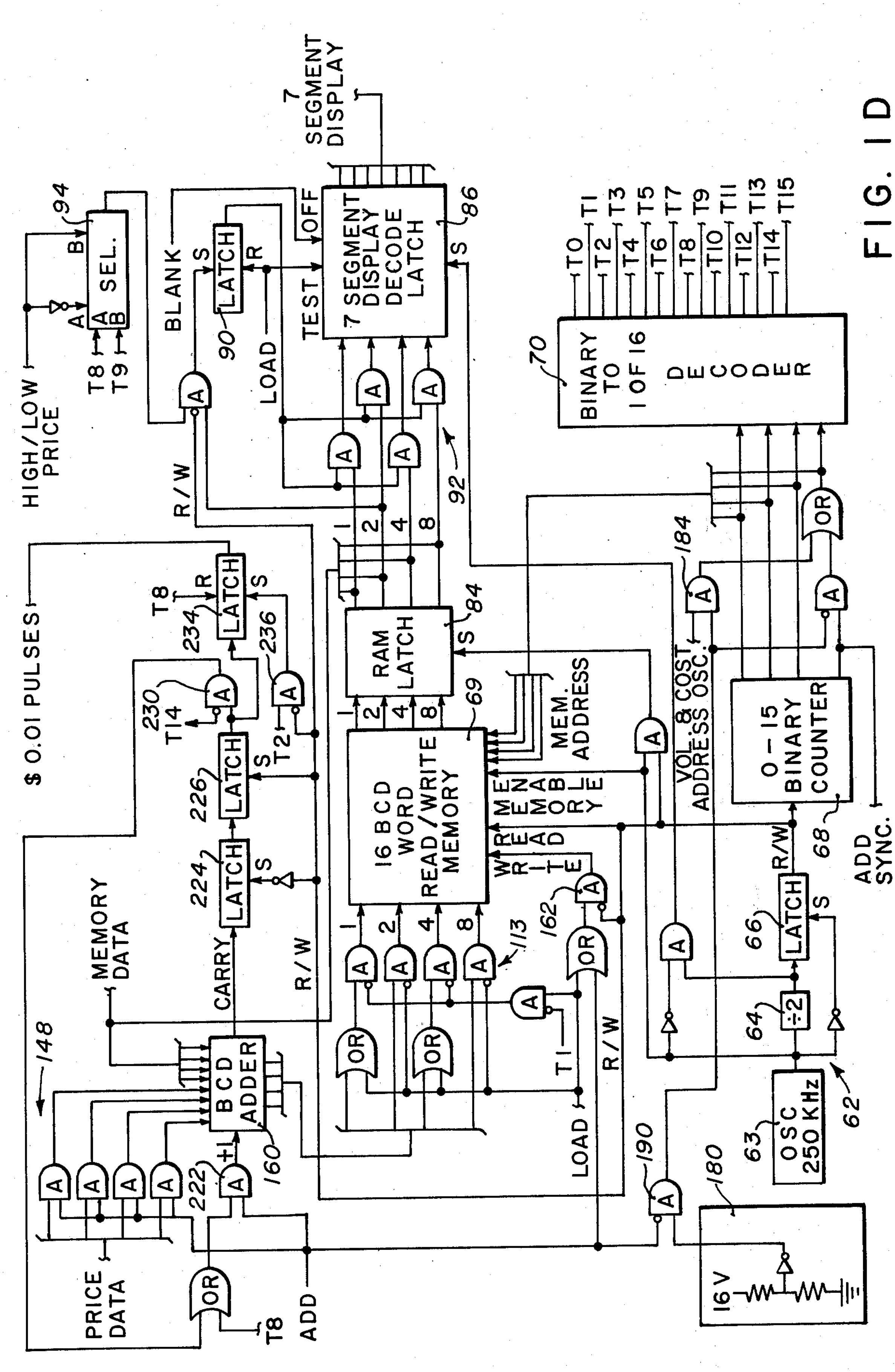

The BCD outputs of the four BCD price decades 136, 137 are transmitted in sequence in ascending order via a selector 140, and the BDC outputs of the two price indicators 55 are thereby transmitted in synchronism to a price comparator 146 for testing that the two indicators ae set at the same price and for generating a "price error" signal if the two price indicator settings are different. The BCD outputs of the four BCD price decades are also transmitted via the selector 140 in ascending order sequence to a bank 148 of AND gates (FIG. 1D) for sequentially adding the BCD price amounts to corresponding BCD counts stored in the 16 word random access memory or RAM 69 as hereinafter described.

It is also contemplated that the unit volume price for each available product at the gasoline delivery station may be remotely set and then serially transmitted to each fuel pump via a single data transmission line and with the unit volume price for the product at each pump being stored and displayed at the pump and then employed for accumulating and registering the cost of the fuel delivered at that pump in the manner the BCD price data from the price indicator 55 is used for accumulating and registering the cost of the fuel delivered.

The subject control and registration system comprises a timing circuit 62 (FIG. 1D) for sequentially generating individual and binary timing signals for properly coordinating and/or synchronizing certain logic processing functions of the system. The timing circuit 62 comprises a 250 kHz oscillator or clock 63 connected via a divide-by-two circuit 64 and a read/write latch 66 to generate a 125 kHz "read/write" or "R/W" signal. The read/write latch 66 is connected to index a 0–15 binary counter 68 with the "R/W" signals for generating sequential binary address signals for addressing the sixteen words or decades of the random access memory or RAM 69 and operating a binary to 1 of 16 decoder 70 in synchronism through full cycles thereof for each cycle of the 16 step counter 68. Accordingly, the decoder 70 provides a timing cycle of sequential digit or word timing pulses T0 through T15, in corresponding output leads of the decoder 70, for the 16 words or decades, hereinafter designated WO–W15 respectively, of the RAM 69.

The binary 8 output signal from the counter 68 is also used as an "add synchronization" signal for generating a full cycle "add" signal for each volume pulse received from the volume pulse generator 22. For that purpose, the binary 8 output from the binary counter 68 is connected for setting a pair of volume pulse storage latches 72, 74 (FIG. 1C) for generating for each volume input pulse to the storage latch 72, a volume output pulse from the latch 74 having a full T0–T15 count cycle duration. Accordingly, a full cycle volume pulse is produced at the output of the timing latch 74 for each one-thousandth increment of a gallon of gasoline dispensed. The "add sync" signal is also employed to timely set a control latch 78 for latching the volume pulse circuit against the generation of volume output pulses from the latch 74 when an "error" signal occurs.

The full cycle volume output pulses from the latch 74 provide a one-thousand pulse/unit volume input to a 1000/100 pulse selector 200 (which is operated to provide a 1000 pulse/unit volume output when the unit volume price is one dollar or more and to provide a 100 pulse/unit volume output when the unit volume price is less than one dollar). A 100 pulse/unit volume input to the selector is provided by a divide-by-10 counter circuit 202 connected via a pulse duration control gate 204 to the selector 200. The divide-by-10 counter circuit 202 is reset by a "load" signal, hereinafter described, prior to the commencement of a fuel delivery and its five count output is used as the input to the control gate 204 so that its hundredths volume output pulses are timed to represent the volume amount of fuel delivered to the nearest hundredth of a gallon. Also, the output of the divide-by-10 counter circuit 202 is connected via a suitable single shot for oerating a remote non-resettable electromagnetic volume totalizer 205.

Memory "enable", "RAM latch" and "display latch" timing signals are also produced by the timing circuit 62 for use with the "R/W" signal for (a) reading the addressed decade of the RAM 69 and storing that BCD data in a RAM output latch 84 during the last half of the first or "read" phase of each digit time cycle; (b) writing the BCD summation output from a BCD adder 160 into the same RAM decade during the last half of the second or "write" phase of the digit time cycle; and (c) latching the BCD data stored in the RAM output latch 84 into the seven segment display decode latch 86 during the entire succeeding digit time cycle.

The seven segment output of the display decode latch 86 is connected for operating the volume and cost digit indicators 135 and whereby the BCD data readout of the RAM 69 during each digit time cycle is decoded and applied to the seven lead output of the display latch 86 during the immediately succeeding digit time cycle, for operating the volume and cost digit indicators 135. The only exception is that a display control latch 90 connected to a bank 92 of input control gates is provided for holding the input to the display latch 86 at binary 0 until two-hundredths of a gallon of fuel is dispensed (i.e., until there is a binary 2 output signal from the RAM latch 84 during the "write" phase of digit time T8 when the unit volume price of the fuel is less than one dollar or at digit time T9 when the unit volume price of fuel is one dollar or more as controlled by the operation of a "high/low price" signal operated selector 94). The initial display hold is provided to prevent an apparent erroneous volume and/or cost display from occurring before a fuel deliveryy has commenced and which could otherwise result from a very slight flow of fuel through the meter 20 due to pressure expansion of the delivery hose 13 when fuel is supplied to the hose under pressure.

In a conventional manner, the pump 10 has an operating handle 100 mounted adjacent the usual fuel delivery nozzle receptacle so that the handle 100 must be placed in its vertical or "off" position before the delivery nozzle can be returned to its receptacle at the end of a fuel delivery and so that the handle 100 cannot be moved to its horizontal or "on" position until after the nozzle is removed from its storage receptacle. The handle 100 is connected to operate an on/off switch 102 to generate an "on" signal when the handle 100 is turned to its horizontal or "on" position. The "on" signal is transmitted to the remote operator's station to signal that a customer wishes to dispense fuel. For that purpose, the "on" signal is used in combination with a suitable flasher 104 to flash a push button lamp (not shown) at an authorization push button 106 on and off, and thereby tell the remote operator that a fuel delivery is requested. For authorizing the delivery, the authorization button 106 is pushed to set a remote pump control latch 107 to generate a "remote pump control" signal. The "remote pump control" signal is transmitted to a pump control gate 116 (FIG. 1B) and to an AND gate interlock circuit 108 for generating an "authorization" signal.

The output signal from the latch 107 also closes a control gate 114 to hold the push button lamp "on" and thereby indicate that a delivery has been authorized. An emergency push button 115 is provided for permitting the operator to reset the latch 107 during the delivery of fuel and thereby close the pump control gate 116 and de-energize the pump 10 without, however, affecting the "authorization" signal which is maintained by the gate interlock circuit 108 until the handle 100 is turned off. The pump can thereafter be remotely re-energized by pushing the authorization push button 106 to continue the delivery of fuel from the existing cost and volume amounts when the pump was temporarily deactivated with the emergency button 115.

The "authorization" signal is effective via a control gate 110 (FIG. 1B) to operate a single shot 112 for generating a 1-second "load" signal for resetting the system for conditioning the system for accumulating and registering the cost and volume of a suceeding delivery of fuel. Such conditioning includes resetting the BCD data in all of the binary storage decades of the RAM 69 to binary zero except that the tenths cent cost storage decade, addressed during digit time T1, is reset to binary 5 via a "load" signal operated gate circuit 113. As a result, the immediately succeeding cent BCD storage decade, addressed during digit time T2, is indexed for registering the cost to the nearest cent.

The 1-second "load" signal also operates the seven segment display decode latch 86 to energize and thereby test the operation of all of the indicator segments of the seven segment indicators 135 of the volume and cost indicators 56, 57 respectively.

A high/low price sensing circuit 210 is operated by the "load signal" via a timing gate 212 for sensing whether the established unit volume price is less than 1 dollar or 1 dollar or more. For that purpose, the price sensing circuit 210 "reads" the BCD output of the dollar price decade transmitted via the decade selector 140. If the dollar BCD output is other than binary zero, a high/low price latch 214 is set to provide a "high" signal in its "high/low" output. The high/low price latch output signal is used to set the selectors 94, 142, 168 and 200 previously described (and also a selector 322 (FIG. 1B) hereafter described) in accordance with the established unit volume price setting — i.e, whether the unit volume price is at least 1 dollar or less than 1 dollar. Accordingly, if the price setting is one dollar or more (a) the pulse selector 200 (FIG. 1C) is set to transmit the 1000 pulse/unit volume pulse train for more accurate computation of the cost of fuel delivered; (b) the price selector 142 (FIG. 1A) is set to add the four digit price commencing at digit time T14 (i.e., T14 through T1) in view of the use of the 1000 pulse/unit volume pulse train; (c) the decimal point timing selector 168 (FIG. 1A) is set for strobing the decimal point at digit time T11 for registering the volume to three decimal places; and (d) the selector 94 (FIG. 1D) is set for timely strobing at digit time T9 the hundredths volume BCD amount stored in the RAM output latch 84.

The 1-second "load" signal is followed by a 1-second "test" signal generated by a single shot 12. The "test" signal in turn generates a "blanking" signal for blanking the display latch 86 and second and third place volume decimal points and thereby verify that the cost and volume indicator segments and decimal points can be de-energized. At the end of the "test" signal, a remote control latch 121 (FIG. 1C) is set to generate a "status" signal for clearing or resetting a remote resettable electromagnetic cost counter 130, and a pump control relay 132 is energized via a pump control latch 134 to activate the pump 10. The pump 10 is thereby conditioned to dispense fuel.

During the delivery of fuel, the memory or RAM 69 is operated to accumulate the volume and cost amounts of fuel delivered and operate the volume and cost indicators to register the accumulated volume and cost amounts of fuel delivered. The RAM 69 is connected to be stepped by the binary RAM address output of the binary counter 68 so that the memory is repetitively cycled through its sixteen BCD words in sequence from words W0 through W15 in synchronism with the decoder 70. The eighth through twelfth BCD decades or words (i.e. word W8 through word W12) of the RAM are used to store the volume amount of fluid delivered, word W8 being used to store the BCD amount of the lowest order place of the volume count (i.e., the hundredths decimal place where the unit volume price is less than one dollar and the thousandths decimal place where the unit volume price is one dollar or more), and the succeeding words W9–W12 being used to store the BCD amounts of the remaining higher order places of the volume count in ascennding order. In like fashion, the eight consecutive words W14 through W6 of the memory are used to store the BCD cost amounts of the cost count of fluid delivered. Word W14 is used to store the BCD amount of the lowest other place (i.e., the sixth decimal place) of the cost count when the unit volume price is one dollar or more, whereas word W15 is used to store the BCD amount of the lowest order place (i.e., the fifth decimal place) of the cost count when the unit volume price is less than 1 dollar. The remaining words (W15 through W6 or W0 through W6 as the case may be) are used to store the BCD amounts of the remaining higher order places of the cost count in ascending order. (The lowest decimal place amounts of the cost count stored in words W14, W15, W0 and W1 of the memory 120 are not, however, displayed by the cost indicator).

During each digit time T0 through T15 of an "add" cycle, the BCD amount stored in the corresponding word of the RAM 69 is read and then stored in the RAM latch 84. The BCD amount in the RAM latch 84 is transmitted to a BCD adder 160 during the digit time and any "plus one" signal applied to the adder 160 via the control gate 222 (as a result of a "carry" from the preceding digit summation or by the application of a T8 digit signal) are added to the BCD amount received from the RAM latch 84 and the summation is then written into the RAM at the same word location by the digit time "write" signal. Accordingly, the BCD price amounts of the four BCD price decades are individually added to the corresponding BCD amounts in the RAM 69 during each "add" cycle. Thus, for example, where the unit volume price is less than 1 dollar and a 100 pulse/unit volume pulse train is employed, the cost of a one-hundredth increment of a unit volume of gasoline (e.g., $0.00689 where the price of gasoline is 68.9 cents per unit volume as shown in the drawings) is added to the BCD cost section of the BCD memory for each one-hundredth gallon volume pulse. Therefore, the cost indicator 38 will continually be updated to indicate the cost of the gasoline dispensed in accordance with the volume dispensed and the established three place unit volume price.

A one count is added to the volume count stored in the RAM 69 during each full cycle "add" signal by the application of the T8 digit timing signal via the control gate 222 to the "plus one" input to the BCD adder 160. Accordingly, the W8 memory decade addressed during digit time T8 (i.e., the hundredths volume decimal place when the unit volume price is less than 1 dollar and the thousandths volume decimal place when the unit volume price is 1 dollar or more) is stepped one count for each "add" pulse generated.

A carry latch 224 is provided for storing a carry if the BCD adder summation during the second "write" phase of each digit time cycle is greater than binary 9. The carry is then transmitted and stored in a second carry latch 226 for being transmitted to the BCD adder 160 as a "plus one" signal during the next digit time cycle for indexing the BCD amount stored in the succeeding RAM storage decade. A transfer is thereby transmitted to the next higher storage decade for accumulating multiple place volume and cost counts of the fuel delivered. The T14 signals operated control gate 230 prevents carries or transfers to word W14 of the cost storage section of the RAM 69.

Also, any "one cent" carry to the BCD adder 160 during digit time T2 is temporarily stored in a latch 234 for indexing the remote cost counter 130 and for indexing, via a divide-by-10 counter 240, a non-resettable electromagnetic cost totalizer 242. The 5 output of the divide-by-10 counter 240 is connected for operating the totalizer so that it registers the total cost amount delivered by the pump to the nearest 10 cent amount.

Each of the digit displays 135 of the cost and volume indicators is momentarily pushed to display the proper numeral count as the RAM is stepped through each cycle by the binary counter 68. The applied voltage to the digit displays 135 is controlled so that the short pulse duration is sufficient to provide adequate display intensity and to prevent noticeable display flickering. The main DC power supply 164 has a 35V output connected via two separate voltage regulators 166 for supplying power for operating the cost and volume indicators. Each voltage regulator 166 is connected to supply power to approximately one-half of the display elements, with one of the voltage regulators 166 supplying power for energizing four of the seven display segments of each volume and cost indicator and with the other voltage regulator supplying power for energizing the remaining three display segments and the decimal points of the second and third place volume indicators.

The handle operated switch 102 is connected for controlling the voltage regulators 166 for establishing a 26V operating voltage when the handle is "on" and a lower 22V operating voltage for diminishing the applied voltage to the cost and volume indicators 135 when the handle is turned "off" for thereby increasing the operating life of the incandescent indicators 135. In addition, the handle operated switch 102 is connected for operating a 5 minute single shot 171 (FIG. 1C) when the switch 102 is turned "off" for de-energizing the indicators 135 with a "blank" signal 5 minutes after the completion of a fuel delivery.

A 12V backup battery 174 is provided for supplying 10V operating power to the logic components via a voltage regulator 175 if the DC power supply 164 fails. Also, the backup battery 174 is connected for supplying 12V battery power for operating the incandescent indicators. Further, as indicated, if the main DC power supply 164 fails, a power supply fail signal is transmitted from a gate 36 (FIG. 1C) to set the error latch 34 for deactivating the pulse transmission circuit and to thereupon reset the pump control latch 134 for de-energizing the pump control relay 132 and deactivating the pump.

A 16V output of the main DC power supply 164 is also used as an input to a suitable main DC power sensing circuit 180 (FIG. 1D) to provide a rapid indication of main DC power failure. Upon such a failure, a low frequency oscillator or clock 182 (FIG. 1C) is operative via a control gate 184 (FIG. 1D) to alternatively energize and de-energize the binary 8 lead to the RAM 69 and decoder 70. Thus, since the cost indicator displays 135 are strobed during the first half of each count cycle (i.e., during digit times T3 through T7) and the volume indicator displays 135 are strobed during the last half of each count cycle (i.e., during digit times T9 through T13), the cost and volume indicators will be alternately cycled on and off for short intervals (e.g., 1 second) by the low frequency oscillator 182 to save battery power. And, the resulting shorter T0–T7 or T8–T15 strobe cycle will provide for energizing each indicator with a longer duty cycle during its "on" phase for energizing its incandescent elements sufficiently brightly with the 12V backup battery 174. However, any "add" signal will close a control gate 190 to provide a full 16 digit counting cycle for updating the cost and volume counts stored in the RAM 169 in the manner previously described.

The low frequency oscillator 182 is also connected via a divide-by-2 circuit 192 (FIG. 1C) and an error control gate 194 to generate a low frequency "blank" signal for flashing the cost and volume indicators off and on to indicate that an "error" has been sensed. Also, when an "error" signal is generated at the same time the main DC power supply 164 fails (as will be the case because of the power failure sensing gate 36), the cost and volume indicators will be operated through on and off cycles alternately (to save battery power) because the "blank" signal frequency is one-half the volume/cost switching frequency.

A preset system 300 shown in FIG. 1B is provided at the remote control station, for example for post-payment or prepayment customer self-service delivery and also if desired at the delivery station for use by a customer or station attendant. The preset system 300 employs a cost/volume selector 302 with a selector knob 303 for selecting cost or volume control. A preset amount selector 304 having a selector knob 305 is provided for selecting a dollars amount of the succeeding fuel delivery (where the selector knob 303 is set at its cost position) or a gallons amount of the succeeding fuel delivery (where the selector knob 303 is set at its volume position). In either the volume or cost setting of the selector 302, the selector 304 is operative to preset only a whole number amount. For example, in the shown embodiment, the selector 304 is operative to select one of the pre-established whole number amounts of 1, 2, 5, 10, 15, 20, 25, 30 and 40 at nine different angular settings of the selector knob 305. Other pre-established whole number amounts may be used as desired. The tenth available position of the selector knob 305 provides a "No-Stop" or non-preset position operative to generate a binary 15 signal in a units output 306 of the selector 304 for holding a pair of output gates 308, 309 of the preset system 300 closed and thereby disconnect the preset system 300 from controlling the operation of the pump 10.

The selector 304 has units and tens binary outputs 306, 307 respectively providing binary encoded outputs of the setting of the selector knob 305. The two lead binary tens output 307 provides a tens range of 0 through 3, whereas the four lead binary units output 306 provides a units range of 0 through 9. The binary output signals in the units and tens outputs 306, 307 are provided to encode a whole number which is one less than the whole number selected by the selector knob 305.

A units/tens selector 310 is connected for selectively connecting the units and tens binary outputs 306, 307 to one of two BCD inputs of a serial comparator 312. A second BCD input of the comparator 312 is connected for receiving BCD outputs from the RAM latch 84. The two BCD inputs to the comparator 312 are serially compared during consecutive digit time intervals for timely comparing the units and tens encoded counts from the selector 304 with the corresponding units and tens counts of the cost or volume amount (depending on the setting of the selector knob 303) stored in the RAM 69.

Also, as will be further described, the tenths count of the accumulated cost of volume amount stored in the RAM 69 is compared to 9 as part of the comparison process. For example, if the whole number amount preset with the selector knob 305 is "15", as shown in FIG. 1B, a binary 1 tens output and binary 4 units output from the selector 304, together with a fixed binary 9 tenths amount will be compared digit by digit in ascending order with the corresponding cost or volume place counts stored in the RAM 69. If the amounts are the same, a "compare" signal is generated in a compare or A=B output of the comparator 312, and the "compare" signal is transmitted via the AND gate 308 to set a first stage valve closure latch 316 (FIG. 1A) for partly closing the two-stage valve 18. Thus, the delivery valve 18 is automatically partly closed by the preset system 300 to slow down the delivery of fuel when the amount of fuel delivered is one-tenth of a gallon or dollar, as the case may be, less than the whole number amount selected with the selector knob 305.

Subsequently, when the accumulated volume or cost amount of fuel delivered (i.e., when the accumulated amount stored in the tens, units and tenths storage decades of the RAM 69) is equal to the selected whole number amount (and is therefore greater than the input comparison signals from the preset system), a "greater" or "A>B" output signal is generated by the serial comparator 312 to indicate that the three-digit BCD memory count is greater than the established three-digit comparison count (14.9 in the example described). The "A>B" output signal is then timely transmitted via the output control gate 309 to reset the pump control latch 134 to de-energize the pump relay 132 and deactivate the pump 10.

A cost/volume selector switch 318 operated by the manual cost/volume selector 302 provides for selectively connecting the appropriate digit timing signals for cost and volume comparisons. However, although for example, the cost digit timing signals T2 through T6 are used in a full cost comparison cycle, only digit time signals T2, T3, T5 and T6 are supplied via the selector switch 318. As will be seen, during the remaining T4 digit time signal, the units/tens selector 310 provides for transmitting the units output from the selector 304 to the comparator 312. Assuming, for purposes of explanation, that the cost/volume selector knob 303 is set at its "cost" position as shown, the first or T2 digit time signal of the comparison cycle provides as a first step for resetting the comparator 312. The following T3 digit time signal operates a gate circuit 320 for applying a BCD 9 signal to the comparator 312 for comparison with the tenths cost count stored in the RAM 69. During the following T4 digit time, the units count from the selector 304 is compared with the units cost count stored in the RAM 69. During the succeeding T5 digit time, the units/tens selector 310 is set so that the tens count from the selector 304 is compared with the tens cost count stored in the RAM 69. Finally, during the following and last T6 digit time of the comparison cycle, the output controlgates 308, 309 are strobed to transmit any "comparison" signal via the gate 308 or any "A>B" signal via the gate 309 for operation of the valve 18 and main pump relay 132 as described.

In similar fashion, when the manual cost/volume selector knob 303 is set for presetting the volume amount of fuel to be dẽlivered, the selector switch 318 is set to provide a similar five step volume comparison cycle. Also, for that purpose, a separate volume timing selector 322 operated by the "high/low price" signal is provided for supplying the correct digit time signals to the cost/volume selector switch 318 in accordance with the established unit volume price.

As will be apprent to persons skilled in the art, various modifications, adaptations and variations of the foregoing specific disclosure can be made without departing from the teachings of the present invention.

We claim:

1. A fluid delivery station control and registration system for selectively controlling the delivery of fluid at the delivery station and for accumulating and registering the cost and volume amounts of fluid delivered, comprising a BCD price selector for establishing a BCD unit volume price within a multiple place decimal price range having at least dollar, ten cent and cent places, pulses means for providing a relatively high and low frequency volume pulse trains having 1000 and 100 pulses per unit volume respectively with a volume pulse for approximately each predetermined decimal increment of fluid delivered, selector means for selecting the relatively high frequency pulse train when the established BCD unit volume price is at least 1 dollar and the relatively low frequency pulse train when the established BCD unit volume price is less than 1 dollar, electronic storage memory circuit means having an electronic storage memory for accumulating and storing the cost and volume amounts of fluid delivered, and storage memory control means for selectively resetting the storage memory and for operating the storage memory circuit means for accumulating and storing in the storage memory the cost and volume amounts of fluid delivered in accordance with the established BCD unit volume price and the number of volume pulses of the selected pulse train.

2. A fluid delivery station control and registration system according to claim 1 further comprising multiple place cost and volume indicators connected to the storage memory circuit means and to the selector means for respectively displaying the cost amount stored in the storage memory to two decimal places and the volume amount stored in the storage memory to two decimal places if the relatively low frequency pulse train is selected and to three decimal places if the relatively high frequency pulse train is selected.

3. In a fluid delivery station control and registration system for selectively controlling the delivery of fluid at the delivery station and for accumulating and registering the amount of fluid delivered, comprising a unit volume price selector for selectively establishing a BCD unit volume price within a multiple place price range, pulse means providing an active volume pulse train with a volume pulse for approximately each predetermined decimal increment of a said unit volume of fluid delivered, electronic storage memory circuit means having an electronic storage memory for accumulating and storing the cost amount of each fluid delivery, storage memory control means for operating the storage memory circuit means for accumulating and storing in the storage memory a multiple place cost amount of fluid delivered in accordance with the number of volume pulses of the active pulse train and the established BCD unit volume price, the storage memory control means being selectively operable for operating the storage memory circuit means for resetting the storage memory for accumulating and storing a multiple place cost amount of the fluid delivered, and delivery control means manually operable for operating the storage memory control means for resetting the storage memory and activating the delivery station for delivering fluid, the improvement wherein the pulse means is operable for providing two interim higher and lower frequency volume pulse trains, each with a volume pulse for approximately each predetermined decimal increment of said unit volume of fluid delivered, having frequencies which differ by a factor of ten, wherein the storage memory control means comprises BCD unit volume price sensing means for sensing if the established BCD unit volume price is greater than a predetermined price level within said multiple place price range and operable for selectively operating the storage memory circuit means for accumulating and storing a multiple place cost amount of fluid delivered in the storage memory in accordance with the number of volume pulses of the higher frequency pulse train if the established BCD price is not less than said predetermined price level and in accordance with the number of pulses in the lower frequency pulse train if the established BCD price is less than the predetermined price level.

4. In a fluid delivery station control and registration system for selectively controlling the delivery of fluid at a delivery station and for accumulating and registering the amount of fluid delivered, comprising a two-stage delivery control valve with first and second stages operable respectively for reducing the rate of delivery and terminating the delivery, pulse means for providing a volume pulse train with a volume pulse for each predetermined incremental amount of fluid delivered, a BCD price selector for establishing a BCD unit volume price within a multiple place price range, electronic storage memory circuit means having a BCD storage memory with cost and volume sections, each having a plurality of BCD storage decades of ascending place, for accumulating and storing multiple place BCD cost and volume amounts respectively of fluid delivered, storage memory control means for operating the storage memory circuit means for accumulating and storing multiple place cost and volume amounts of fluid delivered in the cost and volume sections respectively of the storage memory in accordance with the number of volume pulses and the BCD unit volume price established by the BCD price slector, the storage memory control means being selectively operable for operating the storage memory circuit means for resetting the storage memory cost and volume sections for accumulating the cost and volume respectively of fluid delivered, delivery control means manually operable for operating the storage memory control means for resetting the storage memory cost and volume sections and activating the delivery station for delivering fluid, and preset control means for selectively presetting the amount of a fluid delivery and deactivating the delivery station when the preset amount is delivered, the improvement wherein the preset control means comprises manually operable selector means for selectively presetting a designated cost or volume amount of fluid to be delivered, having a least significant place higher than the least significant place of the corresponding cost and volume section of the storage memory, the selector means providing a diminished BCD amount equal to the designated amount minus one from its significant place, serial comparator means for serially comparing two multiple place BCD inputs and generating a "comparison" signal when they are the same and a "greater" signal when a first of said inputs is greater than a second of said inputs, and means connecting the serial comparator means to serially compare a multiple place BCD preset amount, comprising said diminished BCD amount and a fixed next lower place BCD 9 amount with the corresponding multiple place BCD amount stored in the corresponding memory storage section for generating a "comparison" signal when said BCD amounts are equal and a "greater" signal when the multiple place BCD amount stored in the corresponding memory storage section is greater than the multiple place BCD preset amount, the serial comparator means being connected for operating the first stage of the two-stage valve for reducing the rate of delivery when a "comparison" signal is generated and for operating the second stage for terminating the delivery when a "greater" signal is generated.

5. A fluid delivery station control and registration system for controlling the delivery of fluid at the delivery station and for accumulating and registering the cost and volume amounts of fluid delivered, comprising a BCD price selector for establishing a BCD unit volume price within a multiple place decimal price range, pulse means for providing a volume pulse train with a volume pulse for approximately each predetermined decimal increment of fluid delivered, electronic storage memory circuit means having an electronic storage memory for accumulating and storing the cost and volume amounts of fluid delivered, storage memory control means for selectively resetting the storage memory and for operating the storage memory circuit means for accumulating and storing in the storage memory the cost and volume amounts of fluid delivered in accordance with the established BCD unit volume price and the number of volume pulses and multiple place cost and volume indicators connected to the storage memory circuit means for respectively displaying the cost amount stored in the storage memory to two decimal places and the volume amount stored in the storage memory to at least two decimal places, each of the multiple place cost and volume indicators having multiple place numeral displays consisting essentially of seven bar type incandescent numeral displays, the incandescent numeral displays of the cost and volume indicators except for the lowest order decimal place display of the volume indicator being substantially the same size and the lowest order decimal volume place display being substantially smaller to visibly distinguish the cost and volume indicator displays.

6. In a fluid delivery station control and registration system for controlling the delivery of fluid at the delivery station and for accumulating and registering at the delivery station the cost and volume amounts of fluid delivered, comprising volume and cost indicators at the delivery station, each having a bank of a plurality of incandescent numeral indicators, for displaying multiple place cost and volume amounts of the fluid delivered, a volume pulse means operable for generating a volume pulse for approximately each predetermined volume increment of fluid delivered, price selector means for selectively establishing a BCD unit volume price within a multiple place price range, electronic accumulating means operable by each volume pulse for accumulating and storing a multiple place BCD volume amount of the fluid delivered, and a multiple place BCD cost amount of the fluid delivered in accordance with the BCD volume amount and the BCD unit volume price, connecting means for connecting the bank of incandescent numeral indicators of the volume and cost indicators to the electronic accumulating means for respectively displaying the BCD volume and cost amounts stored therein, power supply means for supplying power to the incandescent numeral indicators, manually operable control means for selectively activating and deactivating the fluid delivery station for delivering fluid, the improvement wherein the control and registration system comprises power control means for energizing the incandescent numeral indicators at a relatively higher intensity when the fluid delivery station is activated for delivering fluid and at a relatively lower intensity when the delivery station is inactivated for delivering fluid and for de-energizing the incandescent numberal indicators after a predetermined interval after the delivery station is inactivated for delivering fluid.

7. A fluid delivery station control and registration system according to claim 6 further comprising error detection means for detecting pulse generation errors of the pulse means and BCD errors of the BCD unit volume price established by the price selector means and operable when an error is detected for cycling the incandescent numeral displays off and on.

8. A fluid delivery station control and registration system according to claim 7 wherein the error detection means is operable for deactivating the delivery station when an error is detected.

9. A fluid delivery station control and registration system according to claim 6 wherein the power supply means comprises a main power supply and a backup battery power supply having a lower voltage than the main power supply, wherein the main power supply is connected for sequentially temporarily energizing the incandescent numeral indicators for a predetermined interval, and wherein the control and registration system further comprises main power supply failure sensing means operable for alternately cycling the incandescent volume and cost indicators off and on when there is a main power supply failure and with the indicators being temporarily energized for a longer interval than said predetermined interval.

10. A fluid delivery station control and registration system for selectively controlling the delivery of fluid at the delivery station and for accumulating and registering the volume amount of fluid dispensed and the cost amount of fluid dispensed in accordance with the volume amount dispensed and an established multiple place unit volume price, comprising a BCD price selector for establishing a plurality of BCD price signals of the amounts of the multiple places respectively of a multiple place unit volume price; pulse means providing a pulse for each predetermined decimal fraction of said unit volume of fluid dispensed; a BCD adder having first and second BCD inputs for respective BCD input signals, a third input for an add one input signal, a BCD summation output for a BDC summation signal of the lowest place of the summation of the first, second and third input signals, and a carry output for a carry output signal of any carry from the summation; a multiple word BCD read/write memory having a plurality of BDC memory words forming a BCD cost word section with a plurality of BCD cost words of ascending order of significance for accumulating a multiple place cost amount of the fluid dispensed and a BCD volume word section with a plurality of BCD volume words of ascending order of significance for accumulating a multiple place volume amount of the fluid dispensed, a timing circuit comprising a binary counter connected to be repetitively indexed through a multiple count cycle having a plurality of counts corresponding to said plurality of BCD memory words respectively and having a multiple lead binary output connected for repetitively activating the plurality of BCD memory words of the memory through a cycle providing for repetitively activating the BCD memory words of each word section in an ascending order sequence; the words of one of said word sections being in the first half of the binary counter cycle and words of the other word section being in the second half of the binary counter cycle, a binary decoder connected to the multiple lead binary output of the counter providing a plurality of digit time signals for the plurality of counts of the counter respectively, the memory having an input for writing a BCD signal into the active memory word and a read output for reading the BCD signal of the active memory word; a cost register having a plurality of incandescent numeral cost place displays for corresponding BCD cost words respectively for registering a multiple place cost amount of the fluid dispensed; a volume register having a plurality of incandescent volume place displays for corresponding BCD volume words respectively for registering a multiple place volume amount of the fluid dispensed; first control means interconnecting the summation output with the memory input, interconnecting the carry output with the third input, and interconnecting the read output with said first BCD adder input and being operable for each digit time signal to write into the active memory word a BCD summation signal of the lowest place summation of any carry signal from the summation for the preceding memory word pulse of the same word section, any second BCD input signal and the preceding BCD signal of the active memory word, means interconnecting the read output with the cost and volume registers and timely operating the incandescent place displays of the cost and volume registers with the digit time signals for registering the BCD signal of the corresponding cost and volume words respectively; and second control means interconnecting the BCD price selector and said second BCD adder input and operable by each pulse generated by the pulse generator for applying the BCD price signals to the second BCD adder input in synchronism with the activation of the corresponding cost words respectively for inclusion in the summation written therein and for applying an add one signal to the third input in synchronism with the activation of the lowest order volume word for inclusion in the summation written therein, power supply means for supplying power for operating the system, and failure sensing means for sensing at least one predetermined failure in the system and operable for alternately energizing and de-energizing the highest binary value output lead of the multiple lead binary output of the binary counter for alternately cycling the cost and volume counters.

11. A fluid delivery station control and registration system for selectively controlling the delivery of fluid at the delivery station and for accumulating and registering the volume amount of fluid dispensed and the cost amount of fluid dispensed in accordance with the volume amount dispensed and an established multiple place unit volume price, comprising a pair of price selectors at the delivery station, each selectively settable for establishing a BCD unit volume price for the fluid within a multiple place price range and for displaying the unit volume price established by the setting thereof, a pair of price selectors being mounted for displaying their unit volume prices to different locations, volume pulse means providing a volume pulse for each predetermined incremental volume amount of fluid dispensed, electronic storage memory circuit means having an electronic storage memory for accumulating and storing the cost and volume amounts of each fluid delivery, electronic memory control means for selectively operating the storage memory circuit means for accumulating and storing in the storage memory the volume amount of the fluid delivered in accordance with the number of volume pulses and for accumulating and storing the cost amount of the fluid delivered in accordance with the number of volume pulses and the BCD unit volume price established by at least one of the price selectors and electronic price selector comparison means for comparing the established BCD unit volume prices of the pair of selectors and deactivating the delivery station for delivering fluid if the established BCD unit volume prices of the pair of selectors are not the same.

12. A fluid delivery station control and registration system according to claim 11 further comprising control means for selectively activating and deactivating the fluid delivery station for the delivery of fluid, detection means for detecting resetting either of the price selectors while the delivery station is activated for the delivery of fluid and deactivating the delivery station for the delivery of fluid if either of the price selectors is reset while the delivery station is activated for the delivery of fluid.

13. A fluid delivery station control and registration system for selectively activating a fluid delivery station for dispensing fluid and for deactivating the fluid delivery station for dispensing fluid and for accumulating and registering the cost amount of fluid dispensed in accordance with a multiple place unit volume price, comprising volume pulse means operable for providing first and second relatively lower and higher frequency pulse trains, having pulses respectively for different relatively larger and smaller decimal fractions respectively of said unit volume of fluid dispensed, a multiple decade BCD price selector for establishing a BCD unit volume price within a multiple place unit volume price range, a multiple word BCD read/write memory having a plurality of BCD memory words forming a BCD cost word section with a plurality of BCD cost words of ascending order of significance for accumulating a BCD multiple place cost amount of the fluid dispensed, first control means connected for repetitively activating the BCD memory words of the cost word section in an ascending order sequence for reading a BCD amount stored therein and writing a BCD amount into storage therein, addition means operable through an addition cycle by each volume pulse of one of the pulse trains for adding each BCD place amount of the BCD unit volume price to the corresponding BCD price amount stored in the corresponding word of the memory and then writing the summation thereof plus any carry from the preceding summation into the memory word for thereby adding, for each such volume pulse, a corresponding decimal cost to the prior accumulated cost stored in the BCD cost word section, price sensing means for sensing the established unit volume price relative to a predetermined price level by sensing the established BCD price amount of one of the places of the multiple place unit volume price range and for selectively connecting the said relatively higher and lower frequency pulse trains for operating said addition means through an addition cycle for each pulse of the selected pulse train in accordance with the BCD price amount of said one place of the multiple place unit volume price range.

14. A fluid delivery station control and registration system for selectively controlling the delivery of fluid at the delivery station and for accumulating and registering the cost and volume amounts of fluid delivered, comprising a BCD price selector for establishing a BCD unit volume price within a multiple place decimal range having at least dollar, ten cent and cent places, pulse means for providing relatively high and low frequency volume pulse trains having $10a$ and $a$ pulses per unit volume respectively with each pulse train having a volume pulse for approximately each predetermined unit volume decimal increment of fluid delivered respectively, selector means automatically operable for selecting the relatively high frequency pulse train when the established BCD unit volume price is equal to and greater than a predetermined price and for selecting the relatively low frequency pulse train when the established BCD unit volume price is less than said predetermined price, electronic storage memory circuit means having an electronic storage memory for accumulating and storing the cost and volume amounts of fluid delivered, and storage memory control means for selectively resetting the storage memory and for operating the storage memory circuit means for accumulating and storing in the storage memory the cost and volume amounts of fluid delivered in accordance with the established BCD unit volume price and the number of volume pulses of the selected pulse train.

15. A fluid delivery station control and registration system according to claim 14 wherein the pulse train selector means is automatically operated by the storage memory control means in conjunction with resetting the storage memory for selecting one of said pulse trains in accordance with the BCD unit volume price established by the price selector.

16. A fluid delivery station control and registration system according to claim 14 further comprising multiple place indicator means connected to the storage memory circuit means and to the selector means for respectively displaying the cost amount stored in the storage memory to two decimal places and displaying the volume amount stored in the storage memory to two decimal places if the relatively low frequency pulse train is selected and to three decimal places if the relatively high frequency pulse train is selected.

17. A fluid delivery station control and registration system according to claim 16 wherein the indicator means comprises a multiple place indicator with at least five places and decimal indication means connected for automatically displaying the volume amount stored in the storage memory to two decimal places if the relatively low frequency pulse train is selected and to three decimal places if the relatively high frequency pulse train is selected.

18. In a fluid delivery station control and registration system for selectively controlling the delivery of fluid at a delivery station and for accumulating and registering the amount of fluid delivered, comprising a two-stage delivery control valve with first and second stages operable for reducing the rate of delivery and terminating the delivery respectively, a price selector for establishing a unit volume price within a multiple place price range, resettable accumulator means having multiple place cost and volume sections respectively for accumulating and storing multiple place BCD cost and volume amounts of fluid delivered in accordance with the volume amount of fluid delivered and the established unit volume price, delivery control means operable for resetting the accumulator means and activating the delivery station for delivering fluid, and preset control means for selectively presetting the amount of fluid delivery and deactivating the delivery station when the preset amount is delivered, the improvement wherein the preset control means comprises manually operable selector means for selectively presetting a designated amount of fluid to be delivered having a least significant place higher than the least significant place of the corresponding multiple place section of the accumulator means, the selector means providing a diminished BCD preset amount equal to the designated amount minus one from its least significant place, comparator means for comparing first and second multiple place BCD inputs and generating a "comparison" signal when they are the same and a "greater" signal when a first of said BCD inputs is greater than a second of said inputs, and means connecting the comparator means to compare a multiple place BCD preset amount, comprising said diminished BCD preset amount and a fixed next lower place BCD nine amount, with the corresponding multiple place BCD amount stored in the corresponding section of the accumulator means for generating a "comparison" signal when said multiple place BCD amounts are equal and a "greater" signal when said corresponding stored multiple place BCD amount is greater than said multiple place BCD preset amount, the comparator means being connected for operating the first stage of the two-stage valve for reducing the rate of delivery when a "comparison" signal is generated and for operating the second stage for terminating the delivery when a "greater" signal is generated.

19. A fluid delivery station control and registration system according to claim 18 wherein the manually operable selector means comprises first selector means operable for individually selecting each of a plurality of whole number designated amounts.

20. A fluid delivery station control and registration system according to claim 19 wherein the manually operable selector means comprises second selector means operable for selectively establishing the designated amount as either a cost or volume amount.

21. A fluid delivery station control and registration system for controlling the delivery of fluid at the delivery station and for accumulating and registering the cost and volume amounts of fluid delivered, comprising a price selector for establishing a unit volume price within a multiple place price range, accumulator means for accumulating the volume amount of fluid delivered to at least two decimal places and the cost amount of fluid delivered to at least two decimal places in accordance with the volume amount delivered and the established unit volume price, and multiple place cost and volume indicators connected to the accumulator means for respectively displaying the cost amount to two decimal places and the volume amount to at least two decimal places, each of the multiple place cost and volume indicators having multiple place numeral displays consisting essentially of seven bar type incandescent numeral displays, the incandescent numeral displays of the cost and volume indicators excepting for the lowest order decimal place display of the volume indicator being substantially the same size and the lowest order decimal volume place display being substantially smaller to visibly distinguish the cost and volume indicator displays.

22. In a fluid delivery station control and registration system for controlling the delivery of fluid at the delivery station and for accumulating and registering at the delivery station the cost and volume amounts of fluid delivered, comprising volume and cost indicators at the delivery station, each having a bank of a plurality of incandescent numeral indicators, for displaying multiple place cost and volume amounts of the fluid delivered, price selector means for selectively establishing a unit volume price within a multiple place price range, volume pulse means operable for providing a volume pulse for approximately each predetermined unit volume increment of fluid delivered, electronic accumulating means operable by each volume pulse for accumulating and storing a multiple place volume amount of the fluid delivered, and a multiple place cost amount of the fluid delivered in accordance with the volume amount delivered and the established unit volume price, connecting means for connecting the banks of incandescent numeral indicators of the volume and cost indicators to the electronic accumulating means for respectively displaying the volume and cost amounts stored therein, power supply means for supplying power to the incandescent numeral indicators, and manually operable control means for selectively activating and deactivating the fluid delivery station for delivering fluid, the improvement wherein the control and registration system comprises error detection means for detecting pulse generation errors in the volume pulse means and price errors in the unit volume price established by the price selector means and operable when an error is detected for cycling at least some of the incandescent numberal indicators off and on.

23. In a fluid delivery station control and registration system for controlling the delivery of fluid at the delivery station and for accumulating and registering at the delivery station the cost and volume amounts of fluid delivered, comprising volume and cost indicators at the delivery station, each having a bank of a plurality of incandescent numeral indicators, for displaying multiple place cost and volume amounts of the fluid delivered, price selector means for selectively establishing a unit volume price within a multiple place price range, volume pulse means operable for providing a volume pulse for approximately each predetermined unit volume increment of fluid delivered, electronic accumulating means operable by each volume pulse for accumulating and storing a multiple place volume amount of the fluid delivered and a multiple place cost amount of the fluid delivered in accordance with the volume amount delivered and the established unit volume price, connecting means for connecting the bank of incandescent numeral indicators of the volume and cost indicators to the electronic accumulating means for respectively displaying the volume and cost amounts stored therein, power supply means for supplying power to the incandescent numeral indicators, and manually operable control means for selectively activating and deactivating the fluid delivery station for delivering fluid, the improvement wherein the power supply means comprises a main power supply and a backup battery power supply having a lower voltage than the main power supply, wherein the main power supply is connected for sequentially temporarily energizing the incandescent numeral indicators of the cost and volume indicators for a predetermined on/off time interval relationship and wherein the control and registration system further comprises main power supply failure sensing means operable for alternately cycling the incandescent volume and cost indicators off and on when there is a main power supply failure and with each of the volume and cost indicators having an on phase with their incandescent indicators energized for a longer on/off time interval relationship than said predetermined relationship.

24. A fluid delivery station control and registration system for selectively controlling the delivery of fluid at the delivery station and for accumulating and registering the volume amount of fluid delivered and the cost amount of fluid delivered in accordance with the volume amount delivered and an established multiple place unit volume price, comprising a price selector having a plurality of rotary BCD price selector decades of increasing order selectively angularly settable for selectively establishing a BCD unit volume price within a multiple place BCD price range, volume pulse means operable for providing a volume pulse for approximately each predetermined unit volume increment of fluid delivered, manually operable control means for selectively activating and deactivating the fluid delivery station for the delivery of fluid, electronic storage memory circuit means having an electronic storage memory for accumulating and storing the cost and volume amounts of each fluid delivery, electronic memory control means for selectively operating the storage memory circuit means for accumulating and storing in the storage memory the volume amount of the fluid delivered in accordance with the number of volume pulses and for accumulating and storing the cost amount of the fluid delivered in accordance with the number of volume pulses and the BCD unit volume price established by the price selector, and price selector detection means for detecting resetting each of the BCD price selector decades during the delivery of fluid and deactivating the fluid delivery station for the delivery of fluid if any of the BCD price selector decades is reset while the delivery station is activated for the delivery of fluid.

25. A fluid delivery station control and registration system according to claim 24 wherein the price selector detection means is operable for detecting that any of the rotary BCD price selector decades is at an intermediate angular setting between angularly spaced BCD price settings thereof and for deactivating the fluid delivery station for the delivery of fluid if any of the BCD price selector decades is at a said intermediate angular setting while the delivery station is activated for the delivery of fluid.

26. A fluid delivery station control and registration system according to claim 24 further comprising volume and cost indicators at the delivery station, each having a bank of a plurality of incandescent numeral indicators, for displaying multiple place cost and volume amounts of the fluid delivered, and wherein the price selector detection means is operable, when detecting that a BCD price selector decade has been reset during the delivery of fluid, for cycling at least some of the incandescent numeral indicators off and on.

27. In a fluid delivery station control and registration system for controlling the delivery of fluid at the delivery station and for accumulating and registering at the delivery station the cost and volume amounts of fluid delivered, comprising volume and cost indicators at the delivery station, each having a bank of a plurality of incandescent numeral indicators, for displaying multiple place cost and volume amounts of the fluid delivered, price selector means for selectively establishing a unit volume price within a multiple place unit volume price range, volume pulse means operable for providing a volume pulse for approximately each predetermined unit volume increment of fluid delivered, electronic accumulating means operable by each volume pulse for accumulating and storing a multiple place volume amount of the fluid delivered and a multiple place cost amount of the fluid delivered in accordance with the volume amount delivered and the established unit volume price, connecting means for connecting the bank of incandescent numeral indicators of the volume and cost indicators to the electronic accumulating means for displaying volume and cost amounts stored therein respectively, power supply means for supplying power to the incandescent numeral indicators, and manually operable control means for selectively activating and deactivating the fluid delivery station for the delivery of fluid, the improvement wherein the power supply means comprises a main power supply and a backup battery power supply and wherein the control and registration system further comprises main power supply failure sensing means operable for deactivating the fluid delivery station for delivering fluid and for alternately cycling the volume and cost indicators off and on when there is a main power supply failure.

28. A fluid delivery station control and registration system according to claim 27, wherein the main power supply is connected for sequentially temporarily energizing the incandescent numeral indicators of the cost and volume indicators for a predetermined on/off time interval relationship, wherein the main power supply failure sensing means is operable for alternately cycling the volume and cost indicators off and on when there is a main power supply failure and with each of the volume and cost indicators having an on phase with their incandescent numeral indicators energized for a longer on/off time interval relationship than said predetermined relationship.

wherein $R^3$ is an alkylene group having from 1 to 8 carbon atoms, and $R^4$ is hydrogen or an alkyl radical, having from 1 to 8 carbon atoms; $R^2$ is an alkoxy or acetoxy group; n is a positive integer of 1 to 3; and (ii) a metal ester of the formula $M—(OR)_x$, wherein M is selected from the group consisting of titanium, aluminum, and zirconium; R is an alkyl radical having from 1 to 8 carbon atoms, and $x$ is equal to the number of valence bonds of M; and

* * * * *